(12) United States Patent
Bugenhagen (10) Patent No.: US 7,701,980 B1
(45) Date of Patent: Apr. 20, 2010

(54) PREDETERMINED JITTER BUFFER SETTINGS

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1233 days.

(21) Appl. No.: 11/188,557

(22) Filed: Jul. 25, 2005

(51) Int. Cl.
  *H04J 3/06* (2006.01)
  *H04L 1/00* (2006.01)
  *H04L 12/56* (2006.01)

(52) U.S. Cl. .................. 370/516; 370/235; 370/395.2
(58) Field of Classification Search ............... 370/236, 370/236.1, 373, 377, 385, 410, 428, 429, 370/496, 516–519, 522, 524, 395.21; 375/371, 375/372
  See application file for complete search history.

(56) References Cited

U.S. PATENT DOCUMENTS

| | | | |
|---|---|---|---|
| 5,777,985 A * | 7/1998 | Nakayama ............ 370/395.62 |
| 5,933,414 A * | 8/1999 | Georgiadis et al. ......... 370/238 |
| 6,366,959 B1 * | 4/2002 | Sidhu et al. ............... 709/231 |
| 6,389,032 B1 * | 5/2002 | Cohen ...................... 370/412 |
| 6,418,125 B1 | 7/2002 | Oran |
| 6,452,950 B1 * | 9/2002 | Ohlsson et al. ............ 370/516 |
| 6,504,838 B1 | 1/2003 | Kwan |
| 6,603,759 B1 * | 8/2003 | Moskal et al. ............. 370/352 |
| 6,658,027 B1 * | 12/2003 | Kramer et al. ............ 370/516 |
| 6,665,317 B1 * | 12/2003 | Scott ........................ 370/516 |
| 6,683,889 B1 * | 1/2004 | Shaffer et al. ............. 370/516 |
| 6,684,273 B2 | 1/2004 | Boulandet et al. |
| 6,704,329 B2 * | 3/2004 | Martin ...................... 370/516 |
| 6,747,999 B1 * | 6/2004 | Grosberg et al. .......... 370/516 |
| 6,765,931 B1 | 7/2004 | Rabenko et al. |
| 6,788,651 B1 | 9/2004 | Brent et al. |
| 6,862,298 B1 * | 3/2005 | Smith et al. ............... 370/516 |
| 7,027,456 B1 * | 4/2006 | Chen ........................ 370/412 |
| 7,079,486 B2 * | 7/2006 | Colavito et al. ........... 370/231 |
| 7,110,422 B1 * | 9/2006 | Choudhury et al. ....... 370/516 |
| 7,359,324 B1 * | 4/2008 | Ouellette et al. .......... 370/230 |
| 7,573,894 B2 * | 8/2009 | Schulz et al. ............. 370/412 |
| 7,599,399 B1 * | 10/2009 | Bugenhagen .............. 370/516 |
| 2003/0026275 A1 * | 2/2003 | Lanzafame et al. ....... 370/412 |
| 2003/0031210 A1 * | 2/2003 | Harris ...................... 370/516 |
| 2003/0086372 A1 * | 5/2003 | Pate et al. ................. 370/235 |
| 2004/0218546 A1 * | 11/2004 | Clark ....................... 370/252 |
| 2005/0047396 A1 * | 3/2005 | Helm et al. ............... 370/352 |
| 2005/0053055 A1 * | 3/2005 | Horvath et al. ........... 370/352 |
| 2005/0058146 A1 * | 3/2005 | Liu et al. .................. 370/412 |

(Continued)

OTHER PUBLICATIONS

Introduction to Circuit Emulation Services over Ethernet The Metro Ethernet Forum 2004.; http://www.metroethernetforum.org, pp. 1-6.

(Continued)

*Primary Examiner*—Chi H Pham
*Assistant Examiner*—Warner Wong (57) ABSTRACT

A communication device having a jitter buffer, the communication device comprising an interface and a processing system. The interface is configured to receive a session setup message for a session between a near end and a far end wherein the session setup message identifies the far end. The processing system is configured to process the session setup message to determine a jitter buffer setting for the communication device based on the far end, and configure the jitter buffer in response to determining the jitter buffer setting.

17 Claims, 8 Drawing Sheets

U.S. PATENT DOCUMENTS

2005/0249115 A1* 11/2005 Toda et al. .................. 370/229
2006/0075428 A1* 4/2006 Farmer et al. .................. 725/38
2006/0109856 A1* 5/2006 Deshpande .................. 370/412
2006/0251093 A1* 11/2006 Curcio et al. .................. 370/412

OTHER PUBLICATIONS

Peter Meyer, "Circuit Emulation Services-over-Packet and Cellular Backhaul," as published in analog Zone; Zarlink Semiconductor Packet Processing, pp. 1-6.

* cited by examiner

PREDETERMINED JITTER BUFFER SETTINGS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to systems, methods, and software for predetermining jitter buffer settings in telecommunication networks.

2. Description of the Prior Art

Jitter buffers are commonly located at the end points of most packet communication paths used for real-time communications. For example, packet voice calls often times originate from a session initiation protocol (SIP) phone running in a packet network and terminate to a plain old telephone service (POTS) phone located on a circuit switched network. Typically, a media gateway is located at the border between the packet network and the circuit switched network to interwork the packet and TDM traffic. In such an example, the entire call path would extend from a SIP phone to a TDM phone. However, the packet communication path would be considered the portion of the call path between the SIP phone and the gateway. In such a case, both the SIP phone and the gateway would be considered end points of the packet communication path. Conventionally, end points employ jitter buffers to reduce the effects of variable latency or delay in the packet communication path.

Given the live nature of real-time applications, jitter buffer operations have a large impact on the quality of real-time applications. For example, an end user could experience either a gap in the operation of or a complete cessation of a real-time application as a result of packet jitter. In addition, jitter buffers can be static or dynamic. Static jitter buffers are configured with a particular size that does not change during operation. When a static jitter buffer becomes congested, packets are simply dropped. Dynamic jitter buffers can be automatically reconfigured to accommodate higher traffic patterns. Dynamic jitter buffers are sometimes referred to as adaptive jitter buffers.

Unfortunately, dynamic current jitter buffers are adapted after the commencement of real-time session traffic. This is problematic because a jitter buffer that is not optimally configured during the initial stages of a real-time session will cause session disruptions, such as session gaps. Furthermore, most end points are configured to use the same buffer adaptation processes, such as buffer threshold metrics or buffer algorithms, for each and every session. Because of these drawbacks, the early stages of real-time sessions often times suffer from the ill effects of poor jitter buffer operation.

SUMMARY OF THE INVENTION

An embodiment of the invention helps solve the above problems and other problems by providing systems, methods, and software products that advantageously pre-determine jitter buffer settings during session setup and prior to the commencement of real-time communications. Such solutions provide for improved session quality during the early stages of a session. In an embodiment of the invention, a communication device having a jitter buffer comprises an interface and a processing system. The interface is configured to receive a session setup message for a session between a near end and a far end wherein the session setup message identifies the far end. The processing system is configured to process the session setup message to determine a jitter buffer setting for the communication device based on the far end, and configure the jitter buffer in response to determining the jitter buffer setting.

In an embodiment of the invention, the jitter, buffer setting comprises the size of the jitter buffer.

In an embodiment of the invention, the jitter buffer setting comprises an adaptation process for adapting the jitter buffer during the session.

In an embodiment of the invention, processing the session setup message to determine the jitter buffer setting based on the far end comprises determining the jitter buffer setting based on the network address of the far end.

In an embodiment of the invention, determining the jitter buffer setting based on previous jitter buffer settings for previous sessions involving the far end.

In an embodiment of the invention, the communication device comprises a voice over packet (VoP) enabled phone.

In an embodiment of the invention, the communication device comprises a media gateway.

BRIEF DESCRIPTION OF THE DRAWINGS

The same reference number represents the same element on all drawings.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
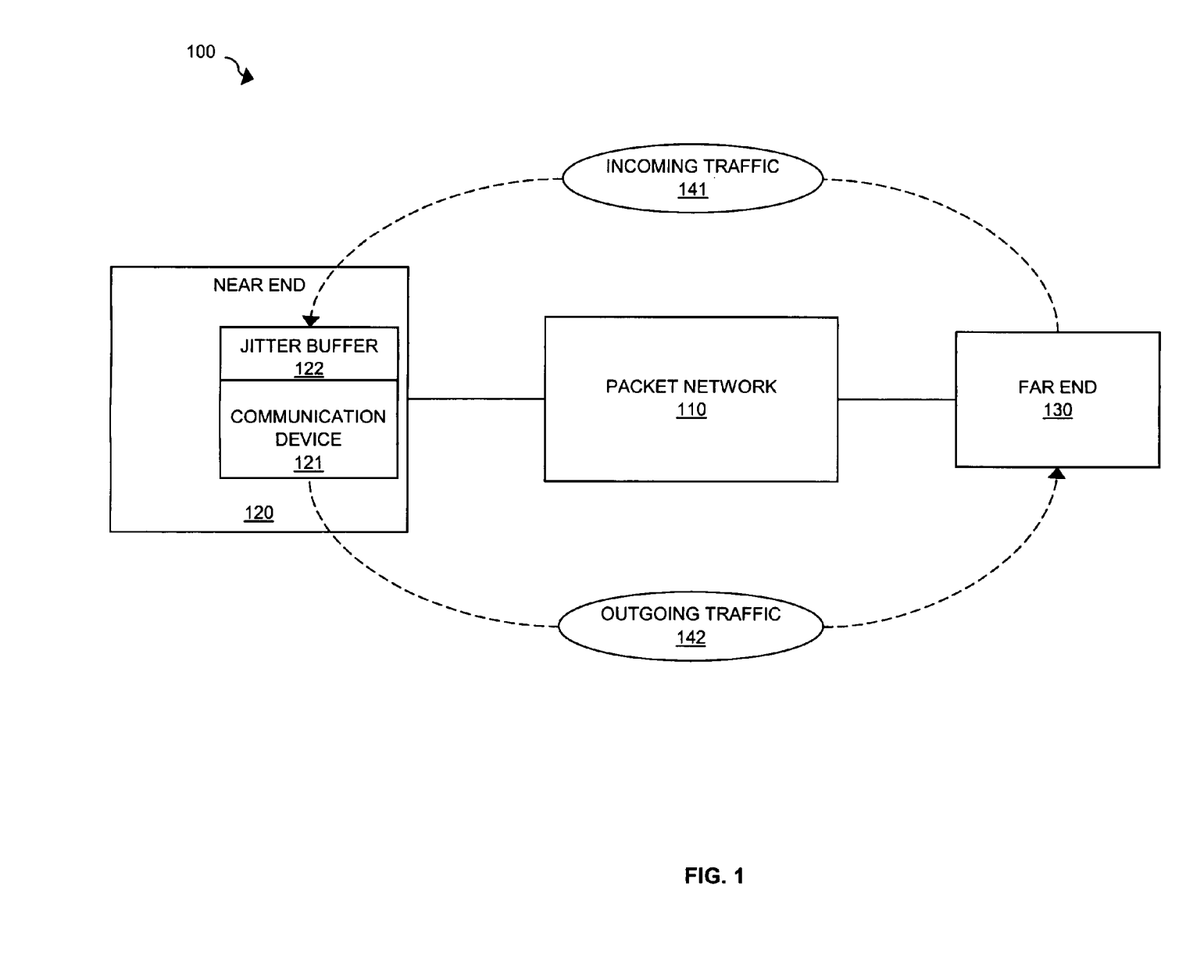
FIG. 1 illustrates a communication network in an embodiment of the invention.
Figure 2:
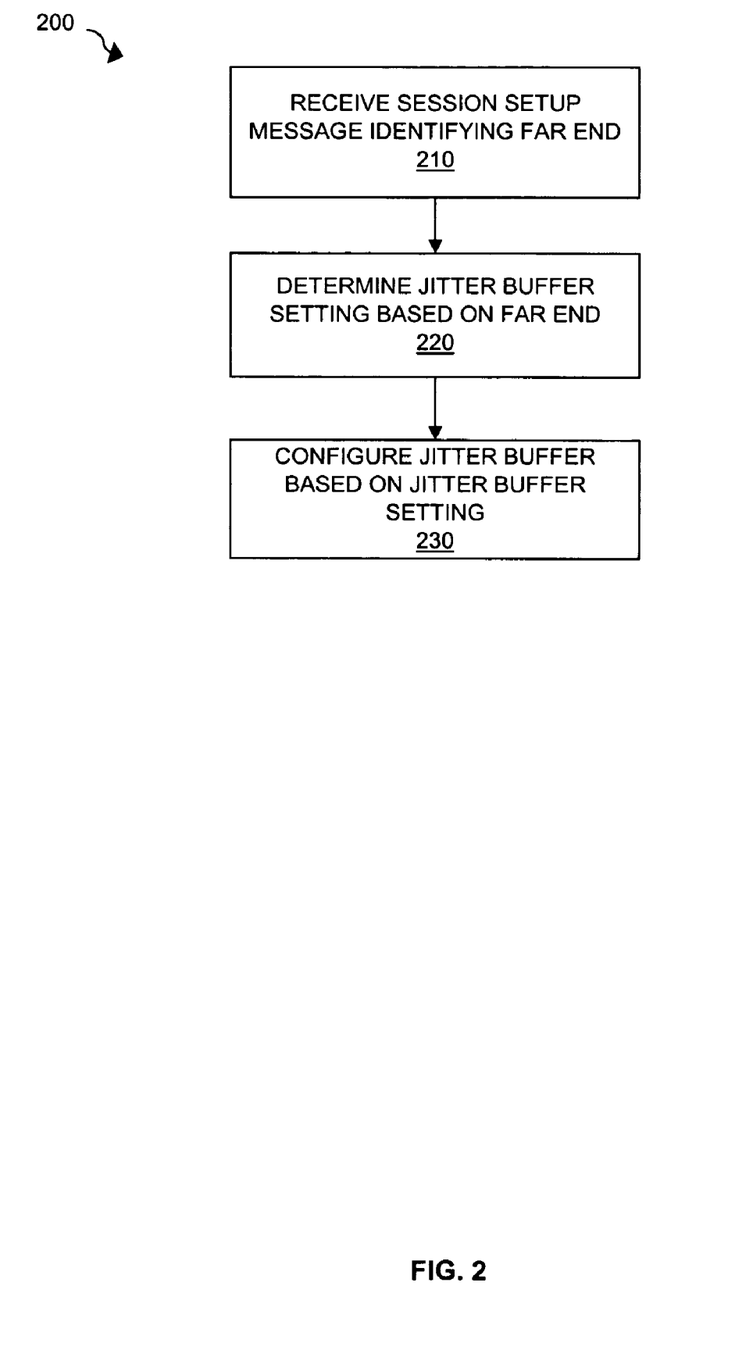
FIG. 2 illustrates the operation of a communication network in an embodiment of the invention.

FIGS. 1-2

FIG. 1 illustrates communication network 100 in an embodiment of the invention. Communication network 100 includes network 110, near end 120, communication device 121, and far end 130. Communication device 121 includes jitter buffer 122. Network 110 could be a packet communication network. Additionally, network 100 could be, but is not limited to, a collection of multiple networks. The multiple networks could be packet networks or synchronous networks, as well as a combination of packet and synchronous networks. Communication device 121 could be, for example, a phone device, a video device, a personal computing device, a music device, or a media gateway, as well as other types of communication devices.

FIG. 2 illustrates the operation of communication network 100 in an embodiment of the invention whereby a session is initiated over a session path between an origin and a destination. The packet communication path between near end 120 and far end 130 over packet network 110 could comprise the entirety of the session path. Alternatively, the packet communication path could comprise a portion of the session path. For example, the packet communication path could be an end leg of the session path. In another example, the packet communication path could be an intermediate leg of the overall session path.

It should be understood that the phrases near end and far end are relative terms used to describe the orientation of the packet communication device with respect to communication device 121. As is commonly understood in the art, jitter buffers are typically employed at the end points of most packet communication paths. Thus, jitter buffer 122 is used to buffer incoming traffic 141 received into communication device 121. Outgoing traffic 142 is transmitted from communication device 121 to far end 130.

To begin, communication device 121 receives a session setup message identifying far end 130 (Step 210). The session setup message could be received in a variety of ways. In one case, communication device 121 could be the session origin. In this case, the session setup message could be received in the form of any well known user input, such as a dialed number or voice command, supplied to communication device 121 through any well known input module. In another case, communication device 121 could be the session destination. In this case, the session setup message could be an invite message transmitted to communication device 121 from an element of far end 130. In another case, communication device 121 could be an intermediate device, such as a media gateway. In this case, the session setup message could be a session control message received from a central control system, such as a soft switch.

In response to the session setup message, communication device 121 processes the identity of the far end to determine a jitter buffer setting for jitter buffer 122 (Step 220). The far end could be identified by a network address indicated in the session setup message. For instance, the session setup message could be an invite message indicating the user and the far end in the form of userID@networkID.com. To determine the setting, communication device 121 could access a look-up table in memory. The table could hold the identity of the far end stored in association with jitter buffer settings.

Upon determining the jitter buffer setting, communication device 121 configures jitter buffer 122 with the determined setting (Step 230). The jitter buffer setting could be, for example, the size of the jitter buffer. The jitter buffer size could be increased to accommodate a large delay inherent to incoming traffic 141. Alternatively, the size of the jitter buffer could be reduced under circumstances whereby the delay associated with incoming traffic 141 is expected to be relatively small. Another jitter buffer setting could be, for example, the adaptation process used to monitor the performance of and adapt jitter buffer 122.

Once jitter buffer 122 has been configured, the normal real-time flow of session traffic can commence. As illustrated in FIG. 1, incoming traffic 141 is buffered in jitter buffer 122. Outgoing traffic is not buffered by communication device 121, but is transmitted to far end 130. Advantageously, communication network 100 provides improvements over the prior art, including the capability to dynamically pre-determine jitter buffer settings during the session setup process and prior to the commencement of real-time traffic exchange. Such capabilities improve quality of service experienced by users during the early stages of a session.

Second Embodiment Configuration and Operation

FIGS. 3-8

Figure 3:
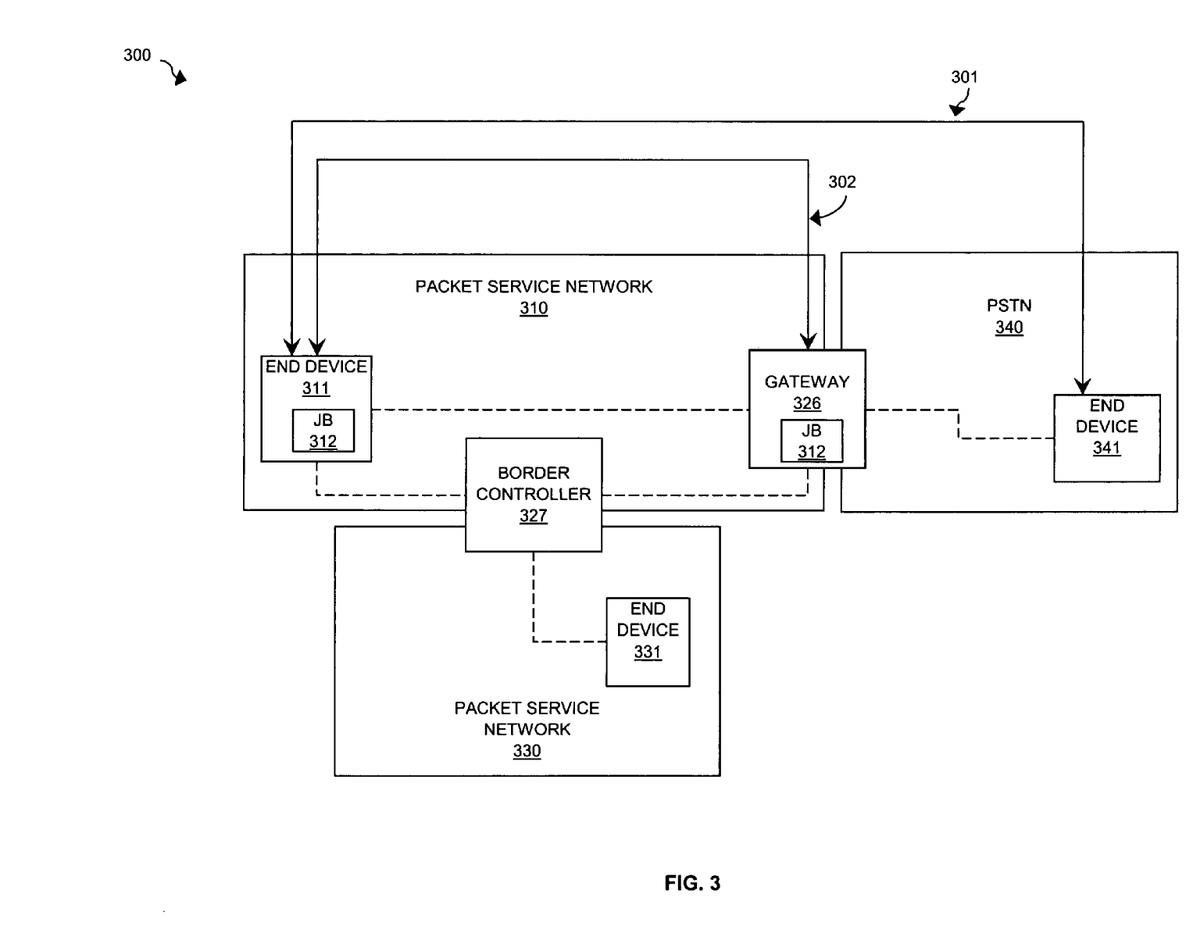
FIG. 3 illustrates a communication network in an embodiment of the invention.

FIG. 3 illustrates communication network 300 in an embodiment of the invention. Communication network 300 includes packet communication network 310 (network 310), packet communication network 330 (network 330), and public switched telephone network 340 (PSTN 340). Network 310 includes end device 311, gateway 326, and border controller 327. PSTN 340 includes end device 341. Network 330 includes end device 331. End device 311 includes jitter buffer 312, and gateway 326 includes jitter buffer 313. Network 310, network 330, and PSTN 340 could include other elements that are not shown for the purpose of clarity.

Gateway 326 operatively couples network 310 to PSTN 340 in a conventional manner. Gateway 326 interworks communications between PSTN and network 310. For instance, gateway 326 translates time division multiplexed (TDM) traffic to a packet format, such as the Internet protocol (IP). Gateway 326 could also provide signaling gateway capabilities. For instance gateway 326 could receive SS7 signaling from PSTN, and generate and transmit a translation to network 310. Border controller 327 interfaces traffic between network 310 and network 330.

End device 311 could be any type of end device capable of participating on a packet service session, such as a voice or video over packet (VoP) session. For example, end device 311 could be a SIP phone configured for VoIP sessions. Similarly, end device 331 could be any type of end device capable of participating in a packet service session, such as a voice or video over packet (VoP) session. End device 341 could be any type of end device capable of interfacing with a circuit switched network, such as PSTN 340, to transmit and receive TDM communications. For example, end device 341 could be a standard POTS phone. Other examples of end device 311 include a mobile phone, a personal computer, or a personal digital assistant, as well as other types of end devices. Furthermore, end device 311 could be a wireless or wireline device. Some examples of well known wireless protocols that could be employed during the VoP session, in the event that the session includes a wireless device, include the CDMA, TDMA, GSM, EVDO, WiFi, and WiMax protocols, as well as other protocols. A specific type of VoP service is voice over Internet protocol (VoIP), although the VoP session is not limited to VoIP. End device 341 could be, for example, a wireless or wireline phone. End device 331 could be similar to end device 311.

Figure 4:
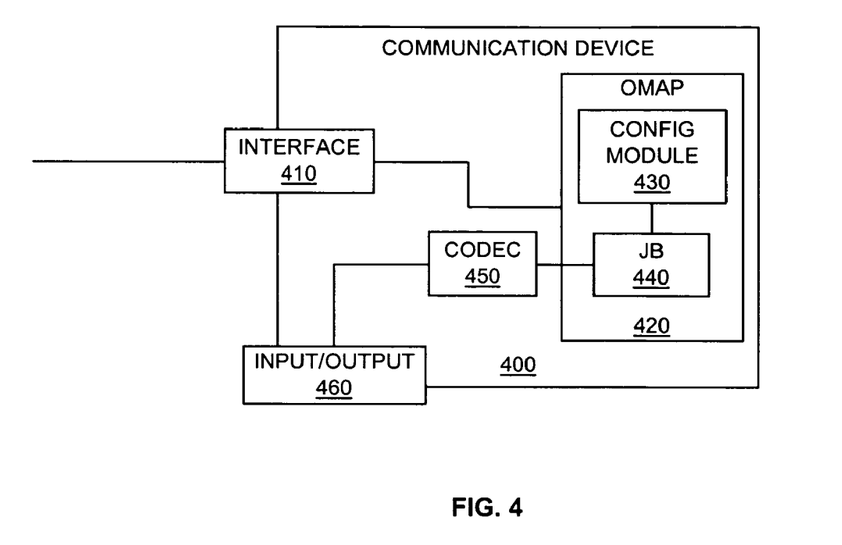
FIG. 4 illustrates a communication device in an embodiment of the invention.

FIG. 4 illustrates communication device 400 in an embodiment of the invention. Communication device 400 could be representative of an end device, such as end devices 311 and 331. It should be understood that communication device 400 is illustrative of communication devices well known in the art, such as cell phones and SIP phones, as well as other types of devices. Communication device 400 includes interface 410, operations and performance module (OMAP) 420, configuration module 430, jitter buffer 440, coder/encoder (codec) 450, and input/output module 460.

In operation, interface 410 receives and transmits packet traffic. The traffic could be bearer traffic, such as voice packets, as well as signaling traffic, such as SIP messaging. OMAP 420 controls the operations of communication device 400, including configuration module 430 and jitter buffer 440. In the case of a voice call, voice traffic is received into interface 410, processed by OMAP 420, and buffered by jitter buffer 440. The buffered traffic is then provided to codec for decoding playback to a user through output 460. The output could be, for instance, a screen playing video or a speaker playing audio. In the opposition direction, input 460 receives input, such as a video feed or an audio feed. Codec 450 encodes the real-time feed and sends the encoded feed in a packetized format to OMAP 420 for further processing. OMAP 420 transfers the feed to interface 410. Interface 410 transmits the traffic to its destination. Configuration module 420 and OMAP 420, separately and in conjunction, control the configuration and operation of jitter buffer 420.

The configuration of jitter buffer 420 could include, for example, the initial size of the buffer, as well as the adaptation processes used to dynamically adapt the buffer during a session. Thresholds are used to generate metrics for measuring the performance of a jitter buffer. Adaptation processes are then applied to the metrics, in addition to other data, to determine performance and to generate response actions. For instance, packet discard rates are considered thresholds. The number or times the discard rate exceeds a particular level is considered a metric. The number of times the rate has been exceeded is processed in accordance with an adaptation process to determine if a jitter buffer requires changes. The percent used of a jitter buffer is also considered a threshold. The number of times the threshold is exceeded is considered a metric. An adaptation process processes the metric with other data to determine a response action, such as enlarging the size of the jitter buffer. Performance algorithms are examples of adaptation processes.

Figure 5:
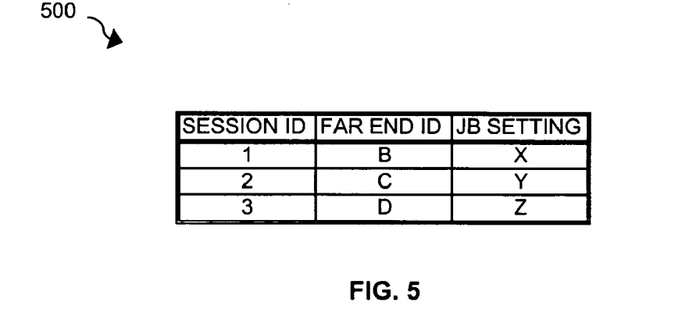
FIG. 5 illustrates a jitter buffer setting table in an embodiment of the invention.

FIG. 5 illustrates table 500 which stores session IDs in association with far end IDs and jitter buffer settings. Table 500 could be stored in configuration module 430, or OMAP 520. Alternatively, table 500 could be stored in other elements of communication device 500, such as cache memory. Over time, communication device 400 populates table 500 with jitter buffer settings on a per session basis. Table 500 could hold additional information, such as the quality of each individual session. The jitter buffer settings could indicate average size of the jitter buffer during a session, the maximum size, and the minimum size. The jitter buffer settings could also indicate the most likely size required stored in association with the far end ID. Table 500 can be updated at the end of every session.

Figure 6:
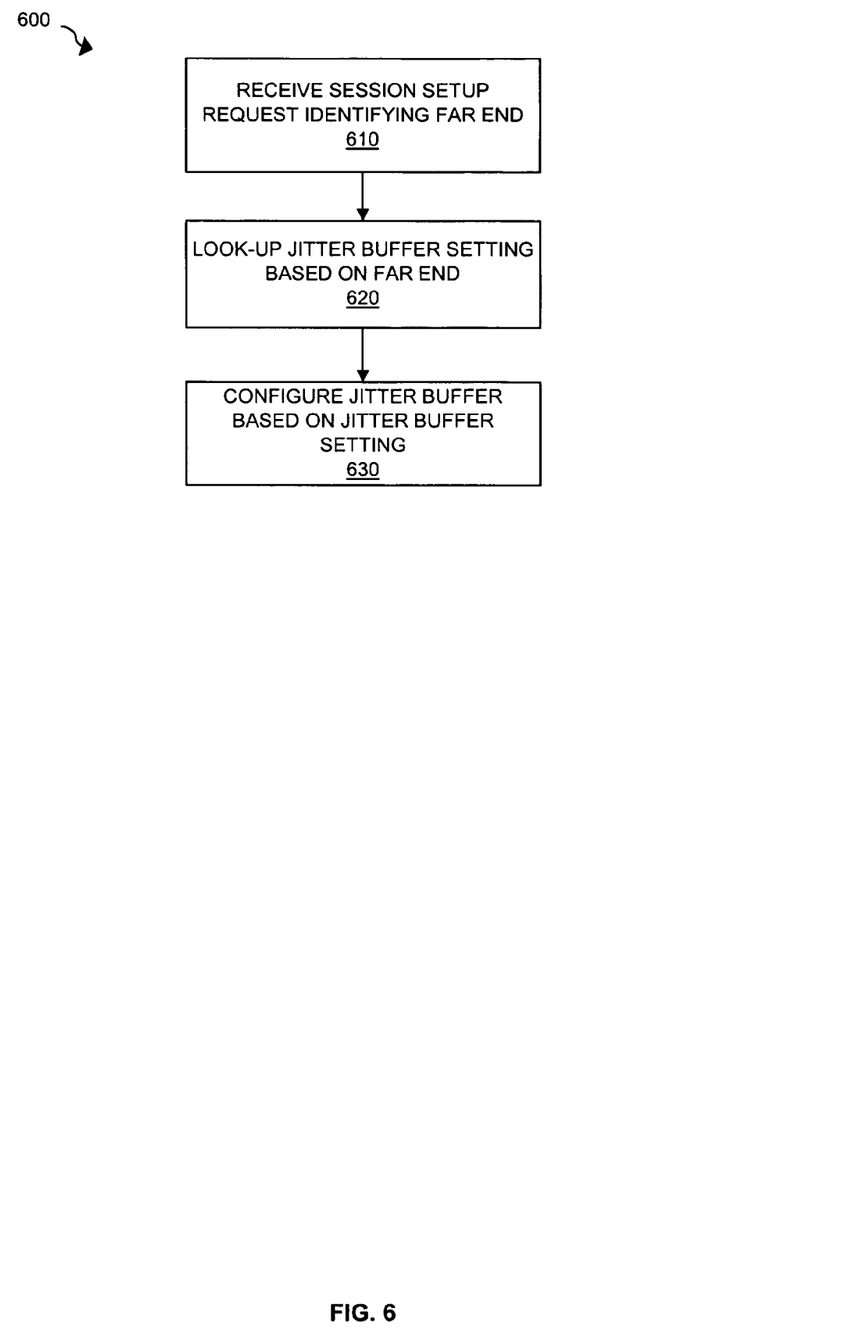
FIG. 6 illustrates the operation of a communication device in an embodiment of the invention.

FIG. 6 illustrates process 600 executed by end device 311 in response to receiving a session setup message for a voice session between end device 311 and end device 341. As discussed above, end device 341 could be similar to, and operate substantially in accordance with, communication device 400. As illustrated by FIG. 3, the overall session path 301 extends between end device 311 and end device 341. The packet communication path 302 extends between end device 311 and gateway 326. Thus, from the perspective of end device 311, gateway 326 would be considered the far end, and end device 311 itself the near end. During the session, gateway 326 will interwork TDM traffic sent from end device 341 into packet traffic destined for end device 311. Depending upon the state of packet communication network 310 and the state of gateway 326, the packet traffic will be buffered by jitter buffer 312, and played out to the user.

To begin, the session setup message is received into end device 311 (Step 610). The session setup message could identify the far end of the packet communication path, namely, gateway 326. Next, end device 311 access a table, such as table 500, to look up the optimal jitter buffer settings for the session based on the identity of the gateway 326 (Step 620). Thus, the setting could be determined based on past performance characteristics for similar sessions involving gateway 326. Lastly, end device 311 configures jitter buffer 312 based on the optimal settings for a session involving gateway 326. As discussed earlier, the optimal settings could include the size of jitter buffer 312, as well as the adaptation processes used to dynamically re-configure jitter buffer 312 during the session. After configuring jitter buffer 312, the remaining steps conventionally taken during session setup can be performed. Once session setup has been completed, regular session operations can commence, such as the exchange of real-time application traffic.

It should be understood that the session setup message could be sent to end device 311 in response to several events. For example, if end device 341 had initiated the session, a soft switch (not shown) would likely transmit a session invite message to end device 311 indicating all the appropriate parameters for the session, such as the address of gateway 326. Alternatively, the session setup message could be a response to a session initiated by end device 311. Likewise, the response could be sent by a soft switch and indicate the address of gateway 326. Other alternatives are possible.

Figure 7:
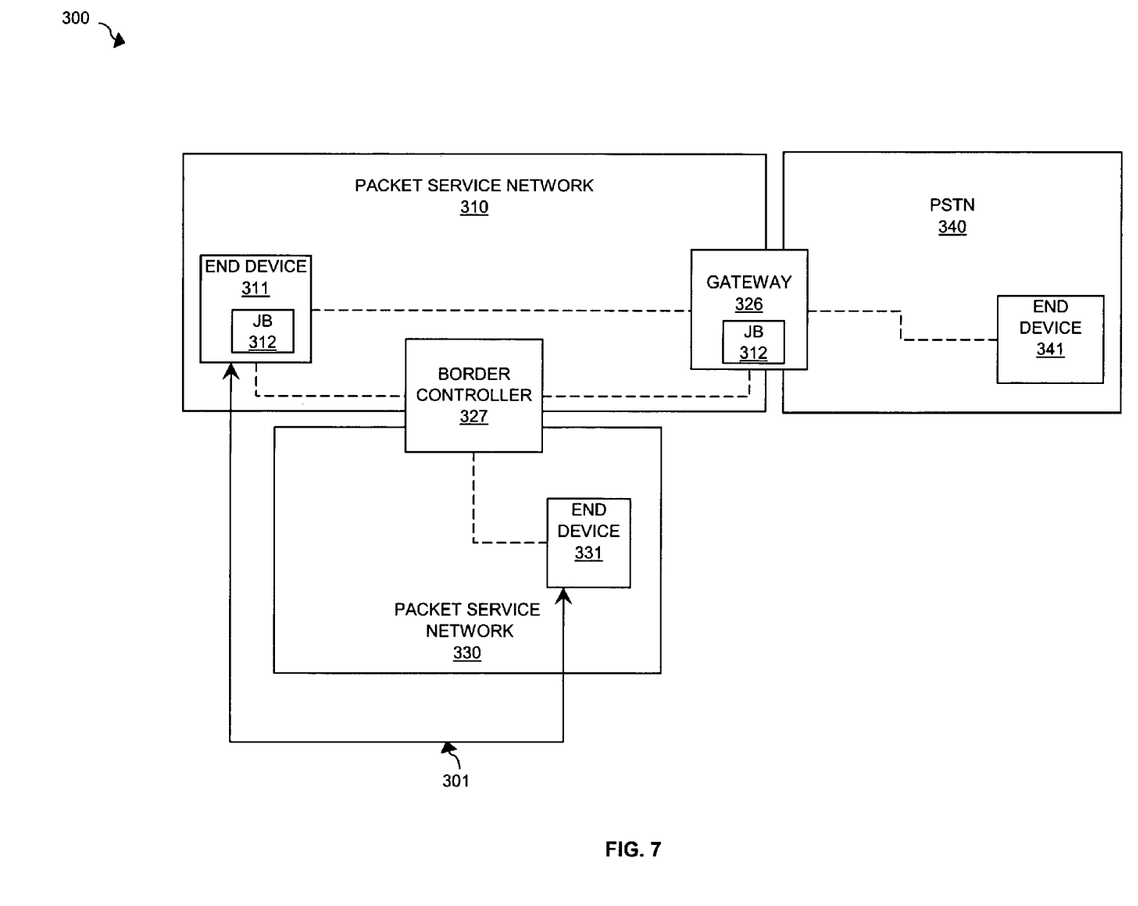
FIG. 7 illustrates a communication network in an embodiment of the invention.

FIG. 7 is substantially the same as FIG. 3, except that FIG. 7 illustrates a different session than in FIG. 3. In particular, the purpose of FIG. 7 is to illustrate that a session could be initiated between end device 311 in network 310 and end device 311 in network 330. In this case, the overall session path and the packet communication path are the same 301. Further in this case, end device 311 would be considered the near end, and end device 331 the far end. End device 311 would receive a session setup message indicated the far end, either by the network address of end device 331, the identity of network 300, or in some other fashion. Jitter buffer 312 would be configured to buffer traffic transmitted by end device 331.

Figure 8:
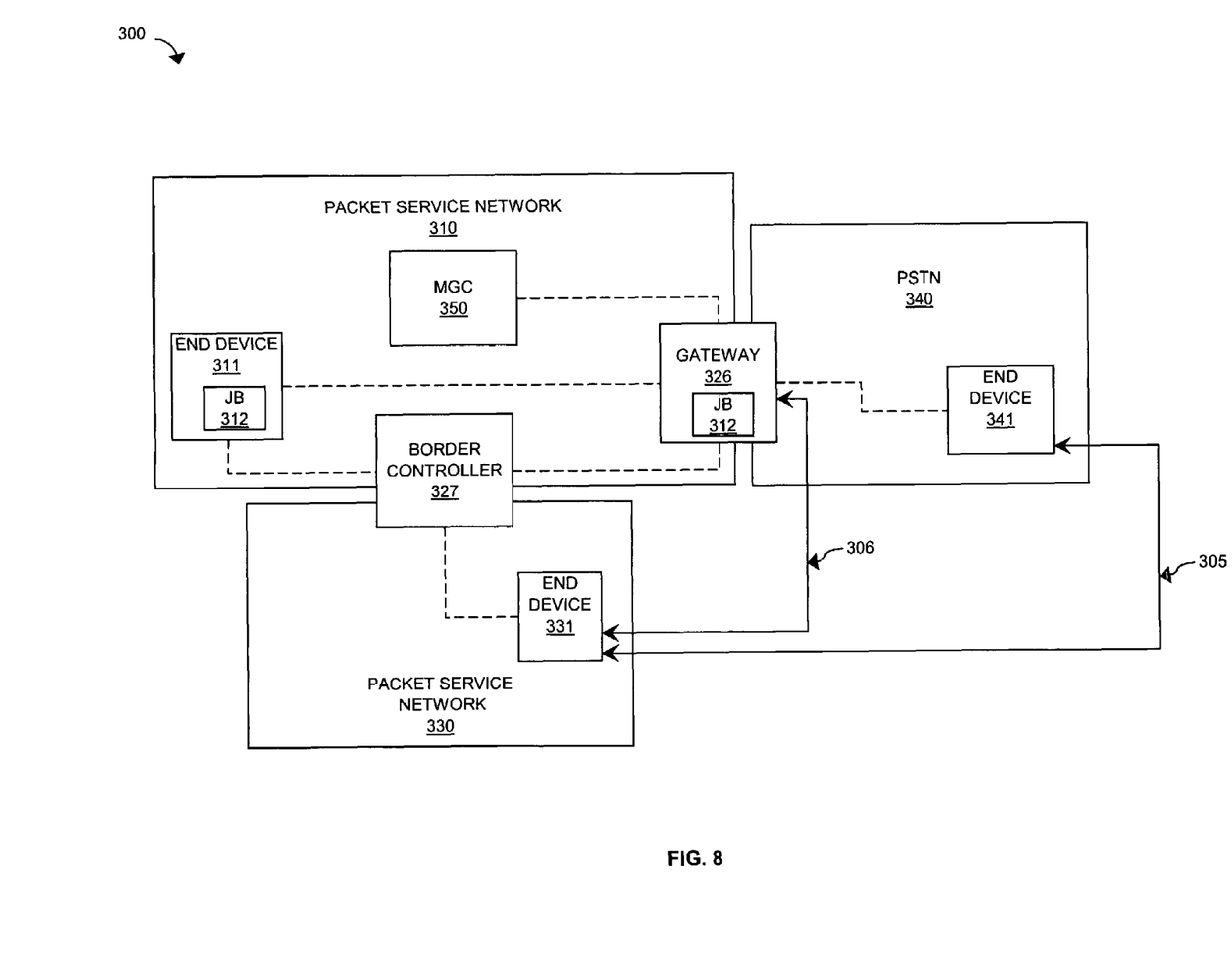
FIG. 8 illustrates a communication network in an embodiment of the invention.
Figure 9:
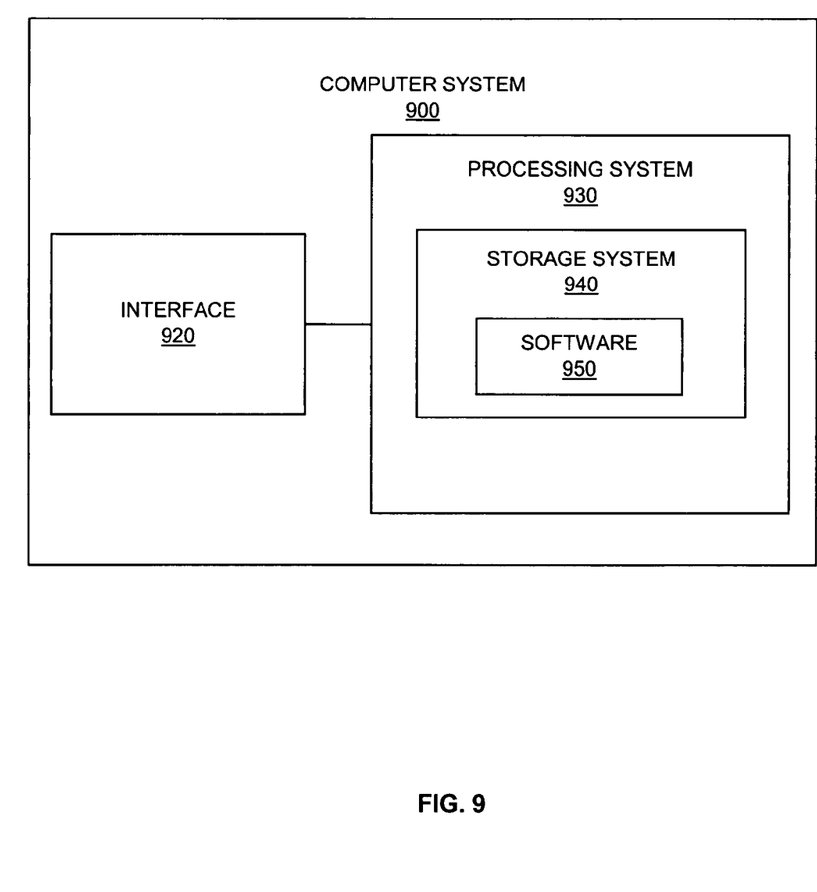
FIG. 9 illustrates a computer system in an embodiment of the invention.

FIG. 8 is also substantially the same as FIG. 3, except that FIG. 8 illustrates a session between end device 331 and end device 341. In this case, the overall session path 305 would extend between end device 341 and end device 331. The packet communication path 306 would extend from end device 331 to gateway 326. Further in this case, jitter buffer 312 would be dynamically pre-configured to buffer traffic send by end device 331 and destined for end device 341.

In this example, communication network 300 includes media gateway controller 350. Media gateway controller 350 could be used for central storage and updating of table 500. Media gateway controller 350 would receive session signaling from either PSTN 340 or network 330 related to the session. Based upon the session signaling, media gateway controller 350 could determine the optimal jitter buffer settings for jitter buffer 312. From the perspective of gateway 326, end device 331 would be the far end of the session and gateway 326 itself the near end. In an alternative, gateway 326 could hold the requisite intelligence itself, such as table 500, and per-configure jitter buffer 312 without the aid of media gateway controller 350.

Advantageously, communication network 300 provides for the dynamic pre-configuration of jitter buffers based on the identity of a far end participating on a session. In this manner, network devices, such as end devices and intermediate devices, can be configured for optimal performance prior to the exchange of real-time session traffic. For example, the size of a mobile phone jitter buffer could be increased to accommodate delay caused by a deficient far end system. In the same way, the size of the jitter buffer could be reduced, compared to the increased size, if the same phone later establishes a session with a more proficient destination system.

Computer System—FIG. 7

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Signaling interface 720 may be distributed among multiple communication devices. Interface 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for the elements of communication networks 100 and 300.

What is claimed is:

1. A method of operating a communication device having a jitter buffer, the method comprising:

receiving a session setup message for a session between a near end and a far end wherein the session setup message identifies the far end;

processing the session setup message to select an adaptation process from at least two adaptation processes for the communication device based on the far end, wherein the adaptation process dynamically adjusts a size of the jitter buffer during the session; and configuring the jitter buffer in response to selecting the adaptation process;

wherein a first adaptation process of the two adaptation processes adjusts the size of the jitter buffer based on a number of times a discard rate is exceeded during the session;

wherein a second adaptation process of the two adaptation processes adjusts the size of the jitter buffer based on a number of times a percentage used of the jitter buffer exceeds a threshold during the session.

2. The method of claim 1 wherein processing the session setup message to select the adaptation process based on the far end comprises selecting the adaptation process based on a network address of the far end.

3. The method of claim 1 wherein processing the session setup message to select the adaptation process based on the far end comprises selecting the adaptation process based on previous adaptation processes for previous sessions involving the far end.

4. The method of claim 1 wherein the communication device comprises a voice over packet (VoP) enabled phone.

5. The method of claim 1 wherein the communication device comprises a media gateway.

6. A communication device having a jitter buffer, the communication device comprising:

an interface configured to receive a session setup message for a session between a near end and a far end wherein the session setup message identifies the far end; and a processing system configured to process the session setup message to select an adaptation process from at least two adaptation processes for the communication device based on the far end, wherein the adaptation process dynamically adjusts a size of the jitter buffer during the session, and configure the jitter buffer in response to selecting the adaptation process;

wherein a first adaptation process of the two adaptation processes adjusts the size of the jitter buffer based on a number of times a discard rate is exceeded during the session;

wherein a second adaptation process of the two adaptation processes adjusts the size of the jitter buffer based on a number of times a percentage used of the jitter buffer exceeds a threshold during the session.

7. The communication device of claim 6 wherein the processing system, to process the session setup message to select the adaptation process based on the far end, selects the adaptation process based on a network address of the far end.

8. The communication device of claim 6 wherein the processing system, to process the session setup message to select the adaptation process based on the far end, selects the adaptation process based on previous adaptation processes for previous sessions involving the far end.

9. The communication device of claim 6 wherein the communication device comprises a voice over packet (VoP) enabled phone.

10. The communication device of claim 6 wherein the communication device comprises a media gateway.

11. A software product for operating a communication device having a jitter buffer, the software product comprising:

software operational when executed by a computer system to direct the computer system to receive a session setup message for a session between a near end and a far end wherein the session setup message identifies the far end, process the session setup message select an adaptation process from at least two adaptation processes for the communication device based on the far end, wherein the adaptation process dynamically adjusts a size of the jitter buffer during the session, and configure the jitter buffer in response to selecting the adaptation process; and a storage medium configured to store the software;

wherein a first adaptation process of the two adaptation processes adjusts the size of the jitter buffer based on a number of times a discard rate is exceeded during the session;

wherein a second adaptation process of the two adaptation processes adjusts the size of the jitter buffer based on a number of times a percentage used of the jitter buffer exceeds a threshold during the session.

12. The software product of claim 11 wherein the adaptation process adjusts the size of the jitter buffer based on a number of times a discard rate is exceeded during the session.

13. The software product of claim 11 wherein the adaptation process adjusts the size of the jitter buffer based on a number of times a percentage used of the jitter buffer exceeds a threshold during the session.

14. The software product of claim 11 wherein the software, to direct the computer system to process the session setup message to select the adaptation process based on the far end, directs the computer system to select the adaptation process based on a network address of the far end.

15. The software product of claim 11 wherein the software, to direct the computer system to process the session setup message to select the adaptation process based on the far end, directs the computer system to select the adaptation process based on previous adaptation processes for previous sessions involving the far end.

16. The software product of claim 11 wherein the communication device comprises a voice over packet (VoP) enabled phone.

17. The software product of claim 11 wherein the communication device comprises a media gateway.

* * * * *